(12) United States Patent
Schindlbeck et al.

(10) Patent No.: US 10,377,617 B2
(45) Date of Patent: Aug. 13, 2019

(54) OPPOSABLE CLAMP ARMS HAVING REPLACEABLE LOWER PORTIONS

(71) Applicant: Cascade Corporation, Fairview, OR (US)

(72) Inventors: Mark Schindlbeck, Oregan City, OR (US); Richard R. Estep, Vancouver, WA (US)

(73) Assignee: Cascade Corporation, Fairview, OR (US)

( * ) Notice: Subject to any disclaimer, the term of this patent is extended or adjusted under 35 U.S.C. 154(b) by 0 days.

(21) Appl. No.: 15/872,694

(22) Filed: Jan. 16, 2018

(65) Prior Publication Data

US 2019/0218082 A1 Jul. 18, 2019

(51) Int. Cl.
*B66F 9/18* (2006.01)
*B62D 65/00* (2006.01)

(52) U.S. Cl.
CPC .............. *B66F 9/183* (2013.01); *B62D 65/00* (2013.01)

(58) Field of Classification Search
CPC ................................ B66F 9/183; B65D 65/00
See application file for complete search history.

(56) References Cited

U.S. PATENT DOCUMENTS

| | | | |
|---|---|---|---|
| 2,782,065 A | 2/1957 | Lord | |
| 3,370,880 A * | 2/1968 | Carliss | B66F 9/183 294/119.1 |
| 3,433,376 A * | 3/1969 | Jordan | B66F 9/183 294/207 |
| 3,643,827 A * | 2/1972 | Link | B66F 9/183 414/621 |
| 7,118,148 B1 * | 10/2006 | Davis | B66F 9/183 294/119.1 |
| 9,321,619 B2 * | 4/2016 | Wang | B66F 9/188 |
| 9,630,821 B2 | 4/2017 | Chase | |

OTHER PUBLICATIONS

Rightline Equipment Carton Clamp video, 2017, avaiable at https://www.youtube.com/watch?v=s5UNZmtEP6o.*
Rightline Equipment, Inc., "Protect your Carton Clamp Investment with Rightline's exclusive ARMOR System" brochure, DOC:A-ARMOR001.004, at least as early as Feb. 17, 2017, 1 page.
Rightline Equipment, Inc., video excerpts of "Carton Clamp"—full video posted on Facebook at least as early as Jan. 2017 (https://facebook.com/RightlineEquipment/videos/1566989059996018/), website accessed Jan. 3, 2019, 5 pages.
United States Patent and Trademark Office; International Search Report and Written Opinion dated Feb. 15, 2019 for PCT App. No. PCT/US2019/012545, 8 pages.

* cited by examiner

*Primary Examiner* — Mark C Hageman
(74) *Attorney, Agent, or Firm* — Chernoff, Vilhauer, McClung & Stenzel, LLP

(57) ABSTRACT

An opposable clamp arm of a load handling device such as a lift truck attachment. An upper clamp pad portion may have a generally planar plate as a main member and may have a load-gripping face layer. A lower clamp pad assembly has a plurality of separately replaceable wear-compensating load-contacting elements mounted interchangeably on a backing plate attached to a stabilizer member of the clamp arm. The load-contacting elements may be secured to the backing plate by retainer bars fastened to the backing plate with flanges of the retainer bars overlapping margins of the load contact elements.

18 Claims, 5 Drawing Sheets

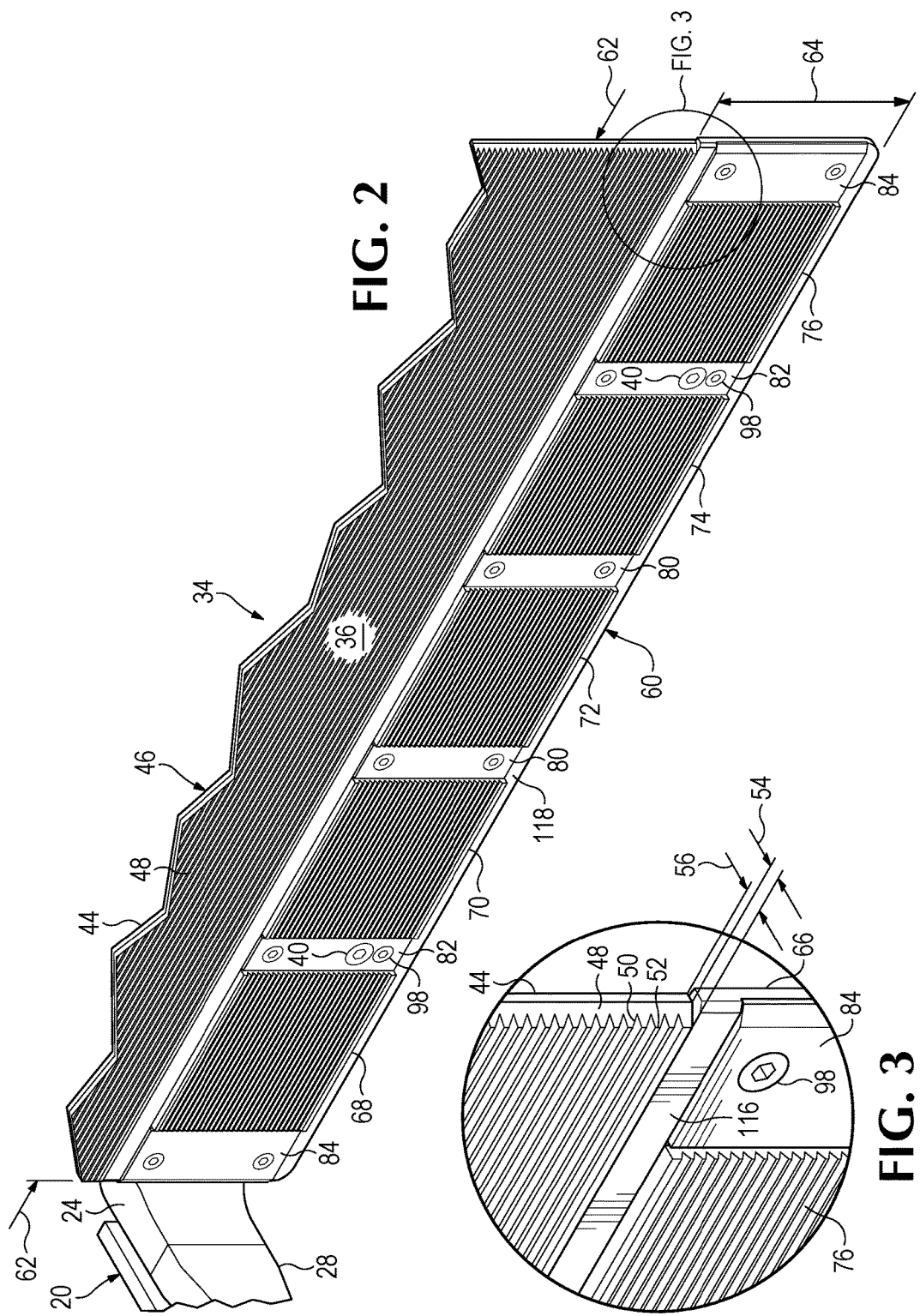

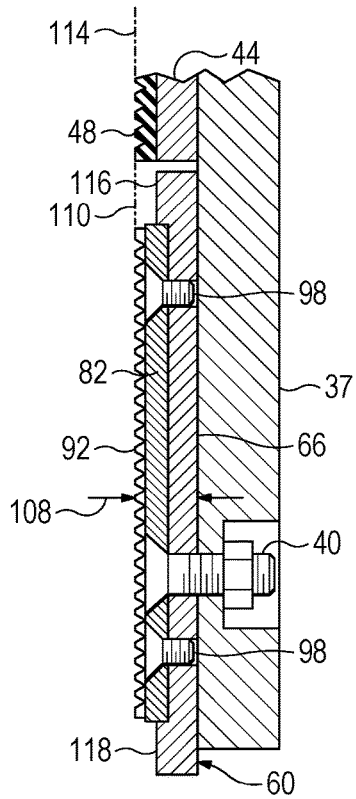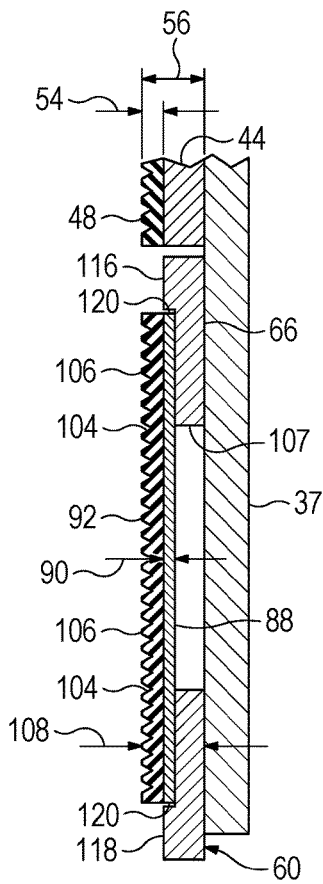
FIG. 6     FIG. 7
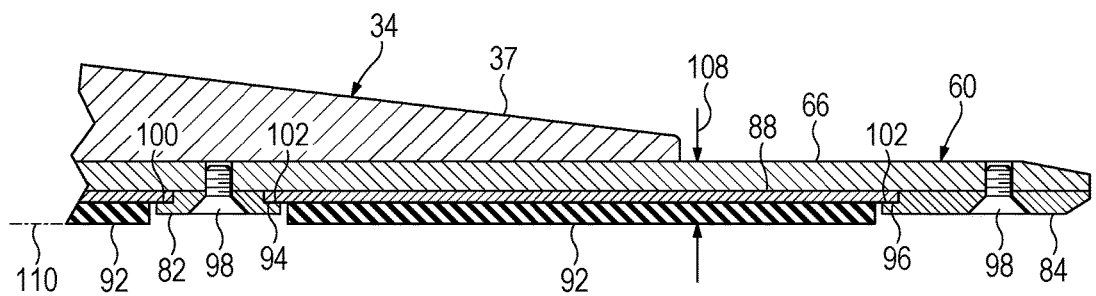
FIG. 8

OPPOSABLE CLAMP ARMS HAVING REPLACEABLE LOWER PORTIONS

BACKGROUND OF THE INVENTION

The present application relates to attachments for lift trucks, and in particular to load-gripping clamp pads for opposable clamp arms that can be mounted on a lift truck to grasp an object such as a carton or a pallet.

Clamp arms can be mounted on a lift truck and arranged for lateral movement toward and away from each other to grasp or release a load, such as a large carton or a pallet on which an object is supported. Such clamp arms may be equipped with clamp pads that often include a surface layer that may incorporate material or have a texture intended to grasp a load securely. Particularly where such clamp arms are used routinely for grasping and lifting loads carried on pallets, the lower portions of clamp pads, and particularly the surface layers, are subject to greater wear than the upper portions. As a result, the ability of the lower portions of the clamp pads to grasp a load securely may be significantly reduced after a time. While the entire surface layer of a clamp pad could be replaced from time to time, such replacement could be costly and time-consuming, as well as being a waste of the capability of all but the lower portion of each clamp pad to continue to serve adequately for grasping loads.

What is needed, therefore, is a clamp arm or clamp pad of which individual worn or otherwise deteriorated portions can be replaced easily and quickly when necessary and without the effort and expense of replacing an entire clamp pad.

SUMMARY OF THE INVENTION

As disclosed in greater detail below, a clamp pad includes a load-grasping face that includes a surface layer having a surface texture or configuration adapted to grip a load securely, by virtue of the surface shape or configuration and of the material of which such a surface layer is constructed. In order to economically extend the service life of a clamp arm, a lower portion of the clamp arm or clamp pad may incorporate a wear-compensating assembly including detachable, individually replaceable segments, each of which may include a surface layer having a configuration intended to provide a secure grip, and such a surface layer may be constructed of material adapted to grip a load securely.

In one embodiment of the clamp arm as disclosed herein, an upper clamp pad part of the clamp arm has a surface layer of a resilient material shaped to securely grip a load such as a corrugated paper carton. A wear-compensating lower clamp pad assembly forms a lower portion of the clamp arm and includes a strong, wear-resistant backing plate member that is removably attached to the clamp arm.

Desirably, the lower clamp pad portion includes a replaceable wear-compensating assembly that may include a backing plate which may have greater wear resistance and durability than a more permanent outer layer of the upper clamp pad portion. Additionally, small easily interchangeable elements, each including a load-gripping face configuration, are attached to the backing plate by retaining members such as clamping bars attached to the backing plate member by fasteners such as countersunk bolts extending through the clamping bars and engaged in threaded bores in the backing plate.

The load-contacting elements of the wear-compensating assembly can be separately removed and relocated, reoriented, or replaced on the backing plate, thereby keeping the lower clamp pad portion of the clamp arm in a condition in which it is able to grasp a load securely.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

FIG. 2 is an isometric view, at an enlarged scale, of a lower portion of one of the clamp arms included in the load-handling attachment shown in FIG. 1.

FIG. 3 is a detail view, at an enlarged scale, of a circled portion of FIG. 2.

FIG. 6 is a sectional view, at an enlarged scale, taken along line 6-6 of FIG. 5.

FIG. 7 is a sectional view, at an enlarged scale, taken along line 7-7 of FIG. 5.

FIG. 8 is a sectional view, at an enlarged scale, taken along line 8-8 of FIG. 5.

DETAILED DESCRIPTION OF PREFERRED EMBODIMENTS

Figure 1:
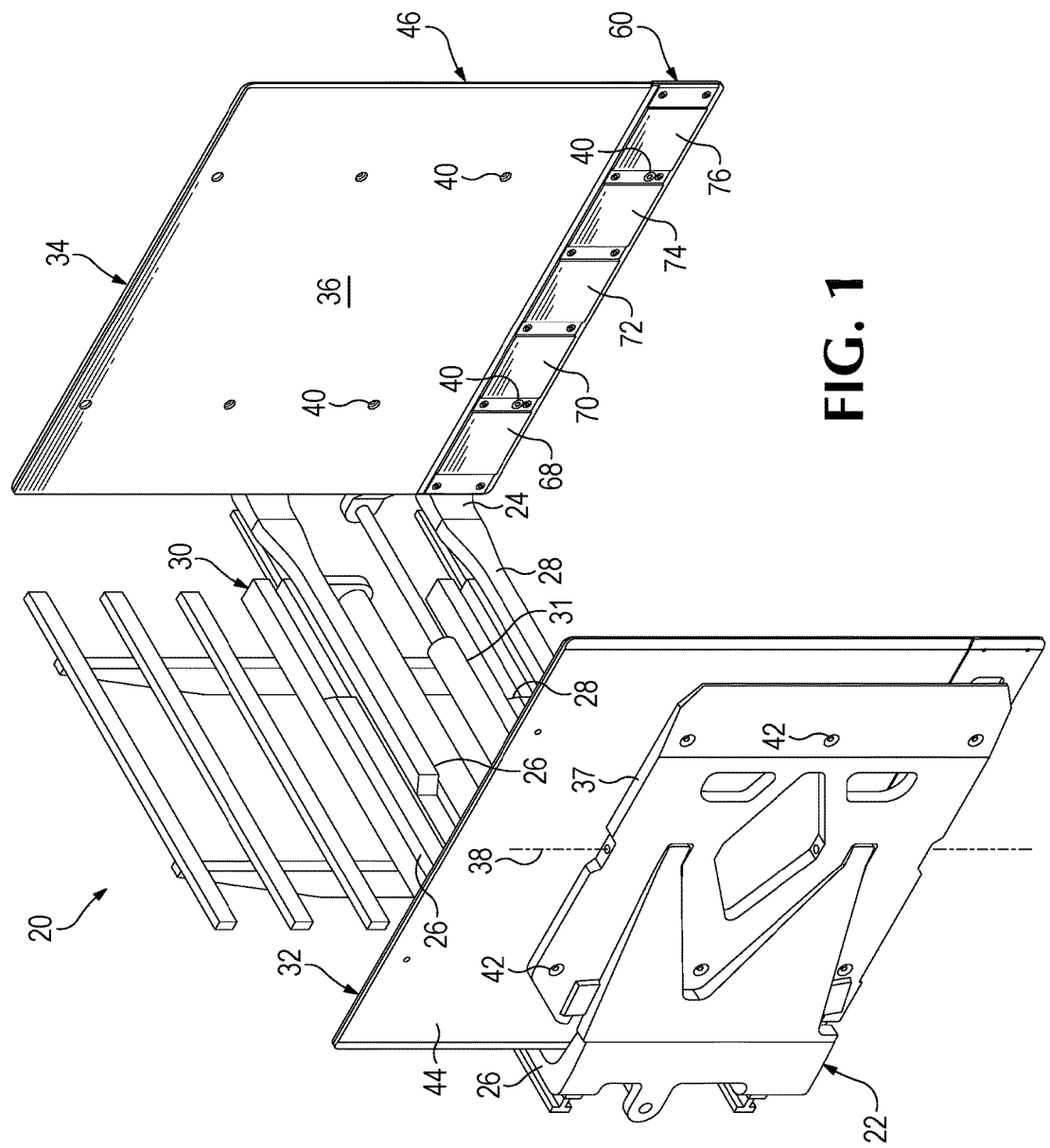
FIG. 1 is an isometric view from ahead and to the right of a typical load-handling lift truck attachment, including a pair of clamp arms incorporating portions that can be replaced individually to extend the useful lifetime of the clamp arms.
Figure 4:
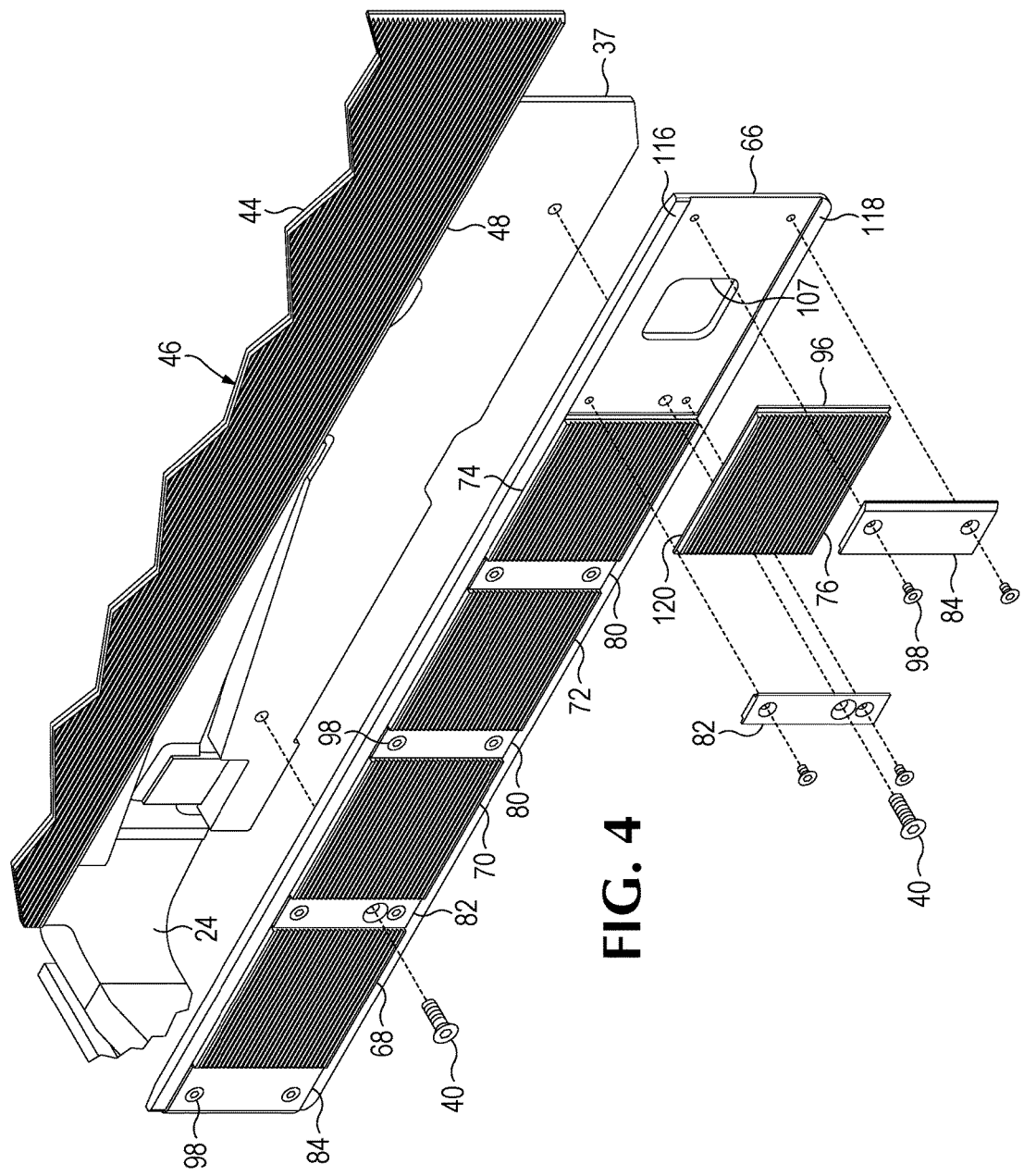
FIG. 4 is an exploded isometric view of the portion of a clamp arm shown in FIG. 2.
Figure 5:
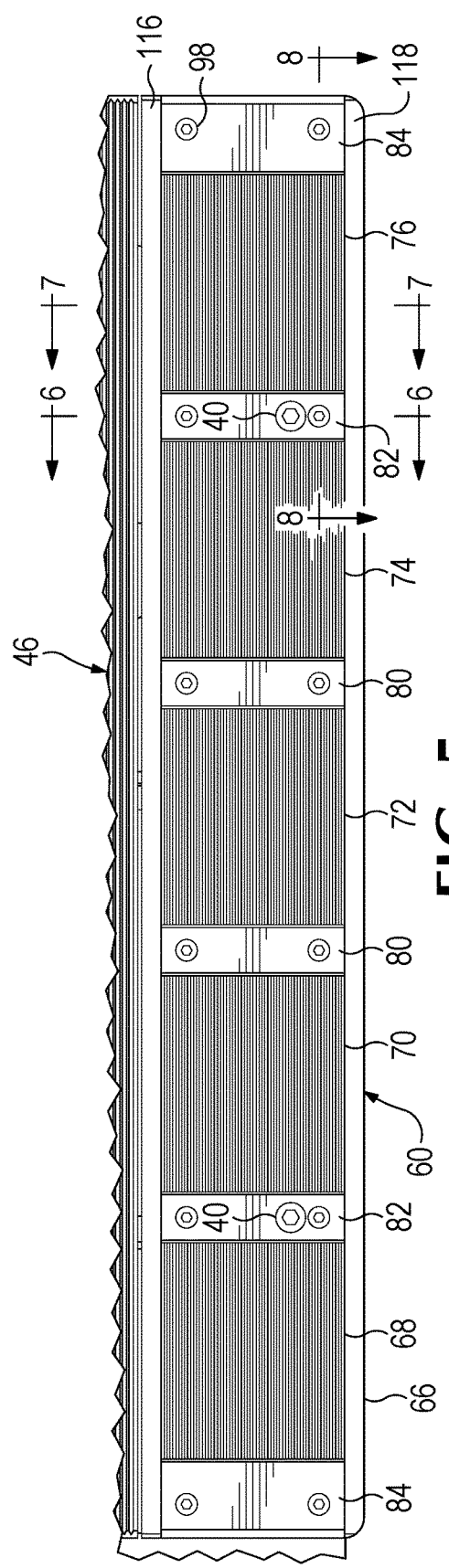
FIG. 5 is an elevational view of the portion of a clamp arm shown in FIG. 2.

Referring now to the drawings that form a part of the disclosure herein, in FIG. 1 a load-carrying lift truck attachment 20 is shown. The load-carrying lift truck attachment 20 includes a pair of clamp arms 22 and 24 mounted on transversely extending members 26 and 28 that are movable with respect to a frame 30 of the lift truck attachment 20, as by hydraulic cylinders 31, and thus enable the clamp arms 22 and 24 to be moved toward and away from each other. Mechanisms that need not be disclosed in detail here are included in a lift truck to allow the lift truck attachment 20 to be raised and lowered with respect to a lift truck on which the load-carrying lift truck attachment 20 is mounted. The clamp arms 22 and 24 are thus available to engage and carry loads such as cartons containing goods or pallets carrying goods which may or may not be enclosed in cartons.

As shown in FIGS. 1-3, each of the clamp arms 22 and 24 carries a clamp pad 32 or 34 and has an interior, load-engaging side 36 that is generally planar and faces toward the opposite one of the pair of clamp arms. Each clamp pad 32 or 34 may be mounted on a respective stabilizer 37 part of the respective clamp arm 22 or 24, providing for a certain amount of pivoting movement about a generally vertical pivot axis 38. The clamp pads 32 and 34 are movable toward each other by movement of the clamp arms 22 and 24 in order to engage and grasp a load to be moved. Each of the clamp pads 32 and 34 may be attached to the respective stabilizer 37 by fasteners such as countersunk bolts 40 extending through bores 42 defined in the stabilizers 37.

Each clamp pad 32 or 34 has an upper clamp pad portion including a generally planar main plate 44, which may be of a suitably strong and light material such as aluminum. Preferably, the interior faces 36 of the clamp pads 32 and 34 not only include a surface configuration but are also of a material intended to provide a secure grip on a load such as a corrugated paper carton by grasping an exterior surface of the load with sufficient friction.

Referring now to FIGS. 2-8, the grip-enhancing surface configuration of an upper clamp pad portion 46 of each clamp arm 22 or 24 may be provided in a generally planar face layer 48 that may be attached to the main plate 44 by a suitable adhesive material. The face layer 48 is preferably of a resilient material such as rubber or a rubber-like composition with a hardness preferably within a range of 55-60 durometer, to apply pressure and provide a firm grip to a load to be grasped. At the same time the face layer 48 should have an ability to conform somewhat to a surface of a load being grasped. Multiple parallel grooves 50 and ridges 52 may be provided in the surface of the face layer 48 to contribute to a secure conforming grip on a load to be lifted. The resilient material of the face layer 48 may have a thickness 54 of about 6.4 millimeters, for example, and the face layer 48 may extend to cover all of the main plate 44, so that the upper clamp arm portion 46 has a thickness 56 of about 16.4-22.4 millimeters, depending upon the thickness of the aluminum main plate 44.

Located immediately below the bottom of the upper clamp pad portion 46, a wear-compensating load-contacting lower clamp pad assembly 60 is attached to the stabilizer 37. The lower clamp pad assembly 60 extends along substantially the entire width 62 of the clamp pad 32 or 34 and may have a height 64 of about 185-200 mm, corresponding roughly with or being slightly greater than the usual height of a conventional cargo pallet. The lower clamp pad assembly 60 includes a backing plate 66 that is preferably made of a strong, wear resistant material such as T-1 steel. Several replaceable load-contact elements 68, 70, 72, 74, and 76 are located alongside one another, separated slightly from each other and attached securely to the backing plate 66 by clamping retainer bars 80, 82, and 84 so that the several load-contact elements 68, 70, 72, 74, and 76 extend over substantially the entire width 62 of the clamp pad 32 or 34.

Each replaceable load-contact element 68, 70, 72, 74, and 76 may have a rigid base sheet 88 of a strong material such as the previously mentioned T-1 steel having a thickness 90 of about 3 millimeters, for example. A generally planar face layer 92 of rubber or rubber-like composition that may be similar to the material of the face layer 48 of the upper clamp pad portion 46, but with a greater hardness, such as about 90 durometer, is attached to the base sheet 88, as by an adhesive. The face layer 92 may preferably cover nearly the entire area of the base sheet 88. Respective narrow vertical margins 94 and 96 located along the vertically extending edges of each replaceable load-contact element 68, 70, 72, 74, and 76 are preferably left as retainer areas, uncovered by the face layer 92, as seen best in FIG. 8.

The retainer or clamping bars 80, 82, and 84 may have flanges 100 and 102 along their vertical margins. As shown in FIG. 8, the flanges 100 and 102 overlap the exposed narrow margins 94 and 96 of the replaceable load-contact elements 68, 70, 72, 74, and 76, holding them tightly against the backing plate 66 when a pair of countersunk flathead bolts 98 in each retainer bar 80, 82, and 84 are tightened into corresponding threaded bores in the backing plate 66. The backing plate 66 may define a lightening hole 107 behind each of the replaceable load-contact elements 68, 70, 72, 74, and 76.

A pair of countersunk flathead bolts 40 extending through the retainer bars 82 and the backing plate 66 are tightened to attach the lower clamp pad assembly 60 to the stabilizer member 37 of the clamp arm 22 or 24.

The clamping retainer bars 80, 82, and 84 and the margins of the replaceable load-contact elements 68, 70, 72, 74, and 76 may instead be chamfered, so that tightening the fasteners 98 holding the clamping bars to the backing plate 66 will tightly fasten the replaceable load-contact elements 68, 70, 72, 74, and 76 to the backing plate 66.

The face layer 92 of each load-contact element 68, 70, 72, 74, and 76 may have a grip-enhancing surface configuration, such as a plurality of parallel grooves 104 and ridges 106 similar to the grooves 50 and ridges 52 of the face layer 48 of the upper clamp pad portion 46. The total thickness 108 of the lower clamp pad assembly 60 may preferably be such that in a new clamp pad 34 the exposed surface of the face layer 92 of the lower clamp pad assembly 60 defines a plane 110 that coincides with a plane 114 defined by the exposed, outer, surface of the face layer 48 of the upper portion 46 of the clamp pad 34. That is, the total thickness 108 may be about 16.4 millimeters, thus about equal to the thickness 56 of the upper clamp pad portion 46, so that the load-contacting surface 36 of the entire clamp arm 22 or 24 is coplanar, and pressure can be evenly applied over the entire surface of a corrugated paper carton that is not resting on a pallet.

An area between the top and the bottom of the backing plate 66 may be recessed, by a distance approximately equal to the thickness 90 of the base sheets 88 of the replaceable load-contact elements 68, 70, 72, 74, and 76, leaving upper and lower horizontal ribs 116 and 118 located where they can support respective top and bottom horizontal margins 120 of the base sheets 88 of the replaceable load-contact elements 68, 70, 72, 74, and 76.

When the lift truck attachment 20 has been used for a considerable amount of time, it is likely that there will be a noticeably greater amount of wear of the face layer portions 92 of the lower clamp pad assembly 60 than is suffered by the face layer 48 of the upper clamp pad portion 46, particularly after the lift truck attachment 20 has been used largely to handle loads carried on pallets. To prolong the ability of the clamp pad 32 or 34 to grasp a load securely, then, individual ones of the replaceable load-contact elements 68, 70, 72, 74, and 76 may be removed from the backing plate 66, by loosening the associated bolts 98 from the backing plate 66, thereby loosening at least one of the retainer bars 80, 82, and 84 sufficiently to permit a desired one of the replaceable load-contact elements 68, 70, 72, 74, and 76 to be removed from its original position. Any or each of the replaceable load-contact elements 68, 70, 72, 74, and 76 may then be individually reoriented, rearranged, or replaced by a new, unused load-contact element that is free from prior wear, thereby at least partially restoring the lower clamp pad assembly 60 to a safely usable condition near its original configuration. If desired, the entire lower clamp pad assembly 60 may be removed from the main plate 44 and the stabilizer 37 of the clamp arm by removing the two bolts 40 attaching the clamp pad assembly 60 to the stabilizer 37 before ones of the individual load-contact elements 68, 70, 72, 74, and 76 are removed from the backing plate 66.

A worn one of the replaceable load-contact elements 68 or 76 may, for example, be rotated 180° and replaced in its original location. Alternatively, one of the replaceable load-contact elements 72 or 74 may be removed from a position near the center of the width 62 of the clamp pad and then mounted at one of the opposite ends of the lower pad assembly 66, or one or more of the replaceable load-contact elements 68, 70, 72, 74, and 76 may be removed and replaced by new replaceable load-contact elements 68, 70, 72, 74, and 76.

After revision of the arrangement of load-contact elements 68, 70, 72, 74, and 76, the lower clamp pad assembly 60 may be replaced on the stabilizer 37, if it has been removed, by refastening the associated bolts 40, so that the clamp pad 32 or 34 is in a safe, effective, condition and may continue to be used instead of being entirely replaced, at a much smaller cost.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A clamp arm for grasping a load, comprising:
   (a) a clamp pad having a width and an upper clamp pad portion including a main body plate member having a first load-grasping face;
   (b) a lower clamp pad assembly, the lower clamp pad assembly being smaller in height than the upper clamp pad portion and including a wear-compensating load-contacting assembly, the lower clamp pad assembly including a second load-grasping face; and
   (c) the wear-compensating load-contacting assembly including:
      (i) a backing plate and a plurality of load-contact elements mounted on the backing plate alongside one another and spaced apart from one another along the width of the clamp pad; and
      (ii) a plurality of separate individual retainer bars and a plurality of fasteners, a respective one of the fasteners connecting each of the separate individual retainer bars to the backing plate, respective ones of the separate individual retainer bars being located between ones of the load-contact elements and having respective flanges overlapping respective portions of respective adjacent ones of the load-contact elements, thereby attaching each of the load-contact elements to the backing plate.

2. The clamp arm of claim 1 wherein the load-grasping face of the upper clamp pad portion includes a face layer of a resilient material on a load-engaging side thereof, the face layer including a surface having grooves and ridges adapted to grip a load securely.

3. The clamp arm of claim 1 wherein the face layer of the load-grasping face of the upper clamp pad portion has a non-planar load-contacting surface configuration.

4. The clamp arm of claim 3 wherein the non-planar load-contacting surface configuration includes a plurality of grooves and ridges.

5. The clamp arm of claim 1 wherein the backing plate is of steel.

6. The clamp arm of claim 1 wherein each of the plurality of load-contact elements includes a base sheet of metal having a rear side and a front side and a face layer of a resilient material attached to the front side of the base sheet, the face layer including a surface having grooves and ridges adapted to grip a load securely.

7. The clamp arm of claim 6 wherein the base sheet is of steel.

8. The clamp arm of claim 6 wherein the face layer of each load-contact element of the lower clamp pad assembly extends over less than all of the front side of the base sheet and wherein the base sheet of at least one of the load contact elements of the lower clamp pad assembly includes a narrow retainer area of the front side of the base sheet that is exposed beyond the face layer along each of a pair of opposite vertical margins of the base sheet.

9. The clamp arm of claim 8 wherein one of the separate individual retainer bars includes a marginal flange extending along and pressing against the narrow retainer area of the front side of the base sheet of one of the load contact elements.

10. A clamp arm for grasping a load, comprising:
    (a) a clamp pad having a width and an upper clamp pad portion including a main body plate member and a first load-grasping face;
    (b) a lower clamp pad assembly, the lower clamp pad assembly being smaller in height than the upper clamp pad portion and including a wear-compensating load-contacting assembly, the lower clamp pad assembly including a second load-grasping face; and
    (c) the wear-compensating load-contacting assembly including:
       (i) a backing plate and a plurality of load-contact elements mounted on the backing plate alongside one another and spaced apart from one another along the width of the clamp pad;
       (ii) a plurality of retainer bars and a plurality of fasteners, a respective one of the fasteners connecting each of the retainer bars to the backing plate, respective ones of the retainer bars being located between ones of the load-contact elements and having flanges overlapping respective portions of respective adjacent ones of the load-contact elements, thereby attaching each of the load-contact elements to the backing plate; and
       (iii) a stabilizer portion, respective ones of the fasteners extending through at least two of the retainer bars and the backing plate and thereby connecting the lower clamp pad assembly to the stabilizer portion of the clamp arm.

11. A lift truck attachment including a pair of opposable clamp arms, one of the clamp arms comprising:
    (a) a clamp pad having a width and an upper clamp pad portion including a main body plate member having a first load-grasping face;
    (b) a lower clamp pad assembly, the lower clamp pad assembly being smaller in height than the upper clamp pad portion and including a wear-compensating load-contacting assembly, the lower clamp pad assembly including a second load-grasping face; and
    (c) the wear-compensating load-contacting assembly including:
       (i) a backing plate and a plurality of load-contact elements mounted on the backing plate alongside one another along the width of the clamp pad; and
       (ii) a plurality of separate individual retainer bars and a plurality of fasteners, a respective one of the fasteners connecting each of the separate individual retainer bars to the backing plate, respective ones of the separate individual retainer bars being located between ones of the load-contact elements and having respective flanges overlapping respective portions of respective adjacent ones of the load-contact elements, thereby attaching each of the load-contact elements to the backing plate.

12. A method of returning a worn clamp arm to a safely usable condition, comprising:
   (a) loosening at least two fasteners, thereby loosening two of a plurality of separate individual retainer bars from a backing plate of a wear-compensating load-contacting assembly included in a lower clamp pad assembly of the clamp arm;
   (b) removing a first replaceable load-contact element from a first position on the backing plate where it has been held by the two of the plurality of separate individual retainer bars;
   (c) placing a second replaceable load-contact element into the first position on the backing plate from which the first replaceable load-contact element has been removed;
   (d) placing two of the plurality of separate individual retainer bars into position to hold the second replaceable load-contact element in the first position on the backing plate; and
   (e) tightening the at least two fasteners, thereby causing the two of the plurality of separate individual retainer bars that have been placed into position to exert pressure against the second replaceable load-contact element and thereby to hold the second replaceable load-contact element in the first position on the backing plate.

13. The method of claim 12 including loosening an additional fastener and thereby loosening an additional one of the plurality of separate individual retainer bars, and removing at least one more replaceable load-contact element besides the first replaceable load-contact element from a respective position on the backing plate, and wherein the step of placing a second replaceable load-contact element into the first position on the backing plate from which the first replaceable load-contact element has been removed includes placing the one more replaceable load-contact element into the first position on the backing plate.

14. The method of claim 12 including the step of removing the lower clamp pad assembly from a position on the clamp arm, prior to the step of loosening two of a plurality of separate individual retainer bars from the backing plate.

15. The method of claim 12 wherein the second replaceable load-contact element is a new, unused, replacement load-contact element free from wear.

16. A method of returning a worn clamp arm to a safely usable condition, comprising:
   (a) loosening at least two fasteners, thereby loosening two of a plurality of separate individual retainer bars from a backing plate of a lower clamp pad assembly;
   (b) removing a first replaceable load-contact element from a first position on the backing plate where it has been held by pressure exerted on the first replaceable load-contact element by the two of the plurality of separate individual retainer bars;
   (c) reorienting the first replaceable load-contact element and then replacing the first replaceable load-contact element, as reoriented, into the first position on the backing plate from which the first replaceable load-contact element has been removed;
   (d) placing two of the plurality of separate individual retainer bars in position to hold the first replaceable load-contact element, as reoriented, in the first position on the backing plate; and
   (e) tightening the at least two fasteners, thereby causing the two of the plurality of separate individual retainer bars to exert pressure against the first replaceable load-contact element and thereby to hold the first replaceable load-contact element, as reoriented, in the first position on the backing plate.

17. The method of claim 16 including the step of removing the lower clamp pad assembly from a position on the clamp arm, prior to the step of loosening two of a plurality of separate individual retainer bars from the backing plate.

18. The method of claim 16 including the step of removing the lower clamp pad assembly from the clamp arm prior to the step of removing a first replaceable load-contact element from the first position on the backing plate of the lower clamp pad assembly.

* * * * *